United States Patent [19]
Reynolds

[11] Patent Number: 5,609,062
[45] Date of Patent: Mar. 11, 1997

[54] COMPOUNDED COUNTERSHAFT TRANSMISSION

[75] Inventor: Joseph D. Reynolds, Climax, Mich.

[73] Assignee: Eaton Corporation, Cleveland, Ohio

[21] Appl. No.: 491,823

[22] Filed: Jun. 19, 1995

[51] Int. Cl.⁶ .................................................. F16H 3/08
[52] U.S. Cl. .................. 74/325; 74/333; 74/331
[58] Field of Search ........................... 74/325, 331, 333, 74/745

[56] References Cited

U.S. PATENT DOCUMENTS

| | | | |
|---|---|---|---|
| 3,105,395 | 10/1963 | Perkins | 74/331 |
| 4,034,620 | 7/1977 | McNamara et al. | 74/325 X |
| 4,152,949 | 5/1979 | Vandervoort et al. | 74/331 |
| 4,269,077 | 5/1981 | Vandervoot | 74/331 |
| 4,388,838 | 6/1983 | Richards et al. | 74/331 |
| 4,428,247 | 1/1984 | Young | 74/331 |
| 4,754,665 | 7/1988 | Vandervoort | 74/745 |
| 4,782,714 | 11/1988 | Schletzbaum et al. | 74/331 X |
| 5,269,194 | 12/1993 | Reynolds | 74/333 X |
| 5,385,066 | 1/1995 | Braum | 74/331 |
| 5,390,561 | 2/1995 | Stine | 74/331 |
| 5,465,630 | 11/1995 | Iwamoto | 74/331 |

*Primary Examiner*—Vinh T. Luong
*Assistant Examiner*—Peter Kwon
*Attorney, Agent, or Firm*—Howard D. Gordon

[57] ABSTRACT

A simple transmission (10) and compound transmission (100, 200, 300) having an extended range and/or number of gear ratios and minimized center distance and/or axial countershaft length is provided by the use of compounded countershafts (16, 116, 216, 316). Each of the compounded countershafts comprises a first portion (20) and a second portion (22) wherein the second portion telescopically surrounds the first portion and is supported for relative rotation thereon by bearing means (28, 128, 228, 328) carried by said first portion. In the compound transmission embodiments, the use of compounded countershafts allows the use of splitter-type auxiliary sections (114, 214, 314) and non-synchronized splitter jaw clutches (76).

28 Claims, 7 Drawing Sheets

COMPOUNDED COUNTERSHAFT TRANSMISSION

BACKGROUND OF THE INVENTION

1. Field of the Invention

The present invention relates to mechanical change-gear transmissions of both the simple and compound type wherein the countershafts constantly driven by the input shaft are compounded and comprise a first portion and a second portion, the second portion telescopically surrounding the first portion, mounted for relative rotation therebetween and in constant driving relation therewith by means of an idler gear.

2. Description of the Prior Art

Mechanical change-gear transmissions of both the single and multiple identical countershaft type are well known in the prior art, as may be seen by reference to U.S. Pat. Nos. 3,105,395; 3,648,546; 4,754,665; 4,876,924 and 4,974,468, the disclosures of which are incorporated herein by reference.

The use of mainsection and auxiliary section countershafts in a compound transmission wherein one of the countershafts is a sleeve supported by the other countershaft is known in the prior art, as may be seen by reference to U.S. Pat. No. 5,390,561, the disclosure of which is incorporated herein by reference.

The use of compounded countershafts to provide an extended ratio range without unduly increasing the center distances in a simple transmission wherein each countershaft portion comprises a separate shaft, each requiring bearing support in a transmission end or intermediate wall at each end thereof, is known in the prior art, as may be seen by reference to U.S. Pat. No. 4,152,949, the disclosure of which is incorporated herein by reference.

SUMMARY OF THE INVENTION

In accordance with the present invention, a mechanical change-gear transmission having the countershafts constantly driven by the transmission input gear (or gears in the case of a transmission having an input splitter or range section) compounded by the use of a 2-portion countershaft having one portion telescopically surrounding the other portion, rotatable relative thereto and in constant driving relationship therewith through an idler gear, is provided. In a preferred embodiment, one of the countershaft portions is a sleeve surrounding the other countershaft portion and supported by bearings carried by the other portion. In another preferred embodiment, the idler gear surrounds the transmission mainshaft and may be combined with a selectively clutchable mainshaft gear.

In a further preferred embodiment of the present invention, one or more of the layers of constantly meshed input or mainshaft and countershaft gears associated with one of the compounded countershaft portions are of the same pitch diameter and number of teeth as layers of constantly meshed mainshaft and countershaft gears associated with the other countershaft portion to simplify and reduce the costs of tooling and machining.

Accordingly, it is an object of the present invention to provide a new and improved mechanical change-gear transmission having a compounded countershaft, or in the case of a compound tranmission, a compounded mainsection countershaft, comprising first and second relatively rotatable portions constantly drivingly connected through an idler gear or gears wherein one of the countershaft portions telescopically surrounds and is supported by the other of the portions.

This and other objects and advantages of the present invention will become apparent from a reading of the detailed description of the preferred embodiment taken in connection with the attached drawings.

DETAILED DESCRIPTION OF THE PREFERRED EMBODIMENT

In this disclosure, certain terminology will be used for convenience in reference only and will not be limiting. For example, the terms "forward" and "rearward" will refer to directions forward and rearward of the vehicle in which the transmission is installed. The terms "rightward" and "leftward" will refer to directions as taken in the drawings in connection with which the terminology is used. The terms "inward" and "outward" will refer to directions toward and away from, respectively, the geometric center of the apparatus being described. All the foregoing terms mentioned include the normal derivatives and equivalents thereof.

For convenience of identification, certain shafts (such as shafts 12 and 18) have been referred to, respectively, as "input shafts" and "output shafts." This terminology, however, has been used for convenience in reference only and is to be given no limiting significance inasmuch as the various transmission embodiments described will operate with the direction of power flow reversed.

Figure 1:
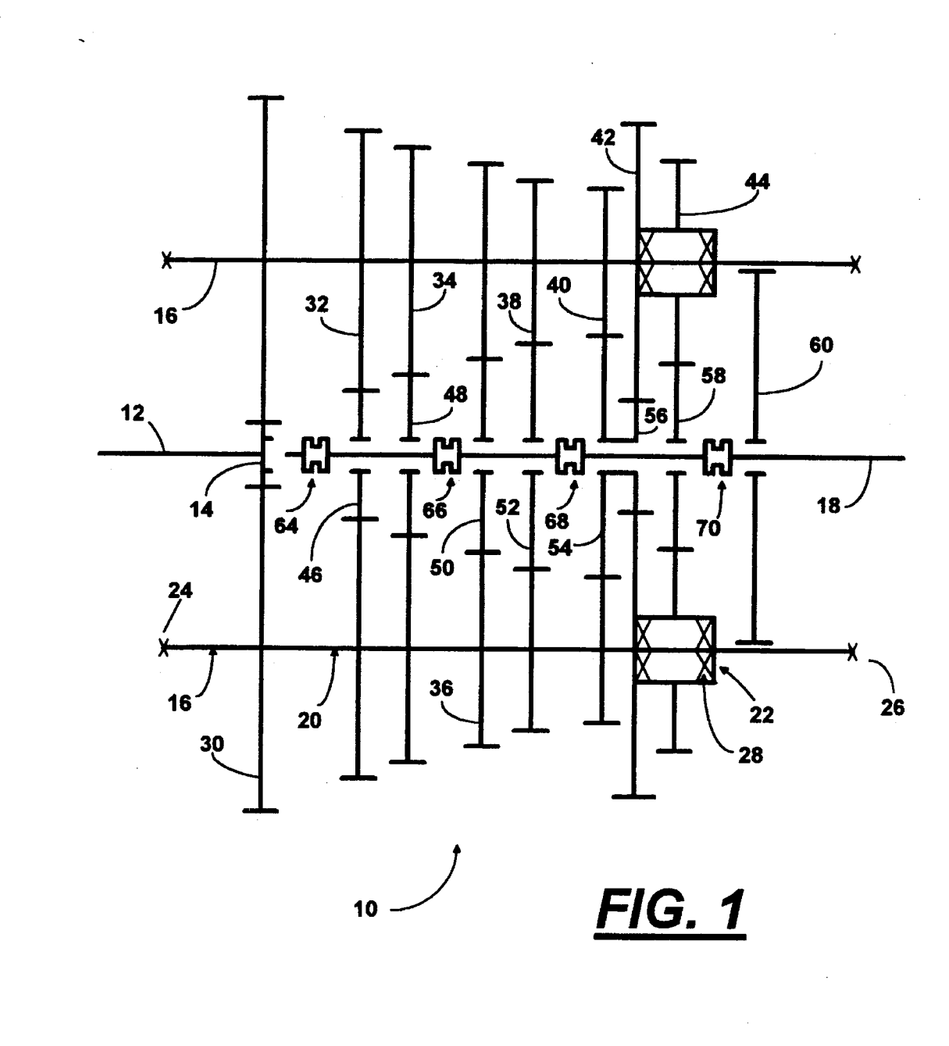
FIG. 1 is a schematic illustration of one embodiment of the present invention.
Figure 2:
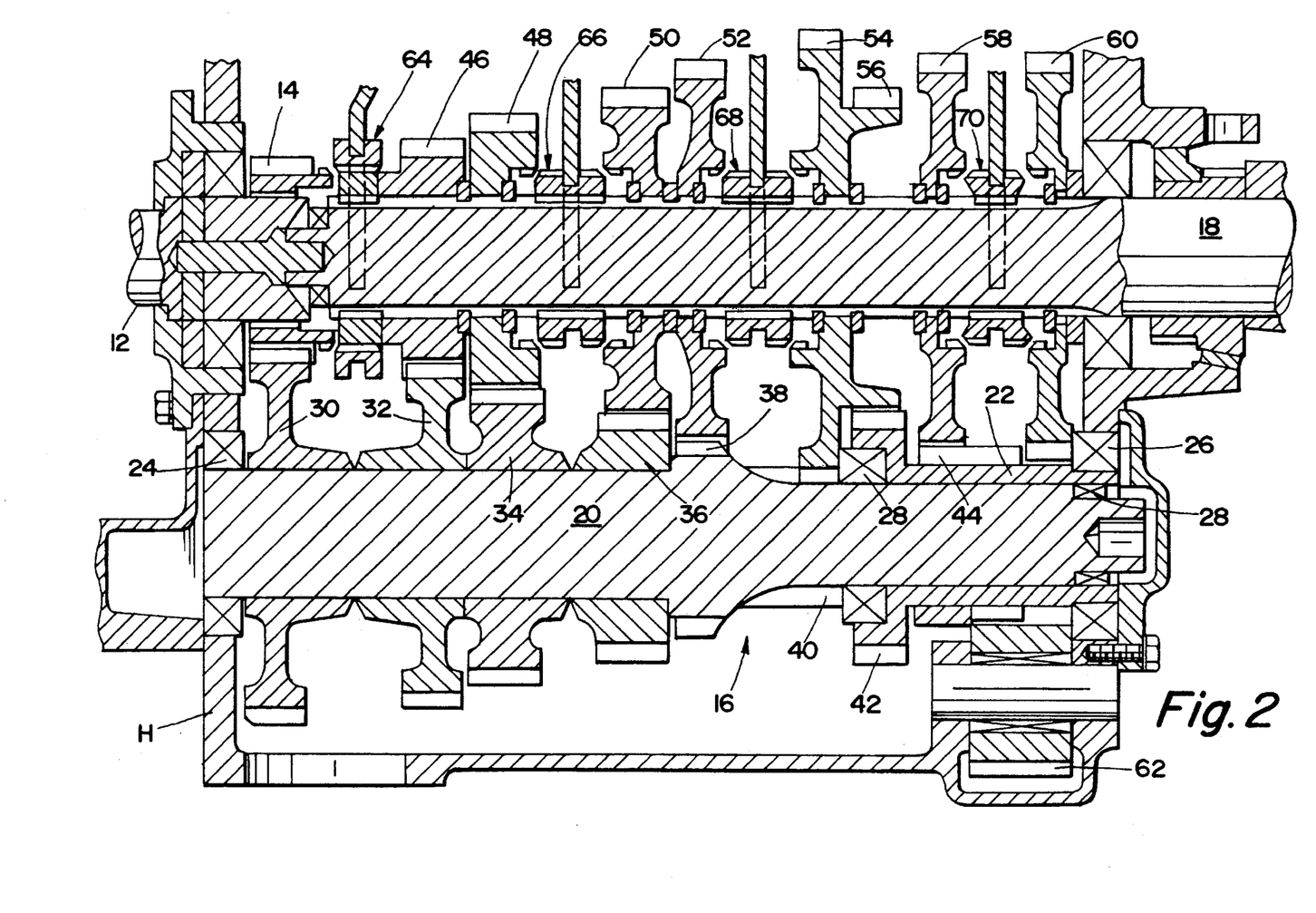
FIG. 2 is a sectional view of the transmission schematically illustrated in FIG. 1.
Figure 3:
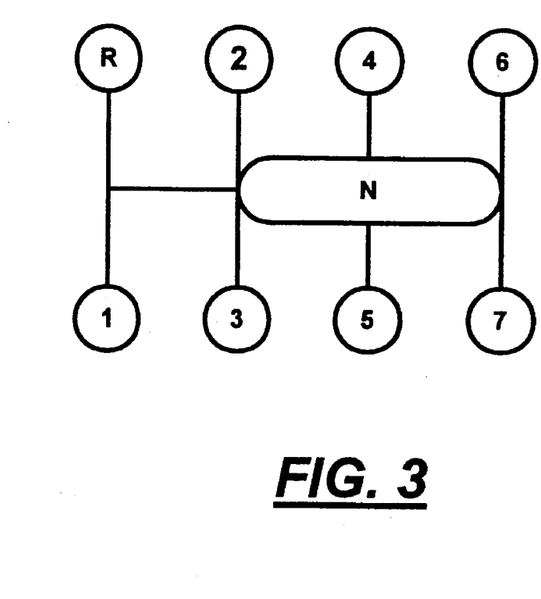
FIG. 3 is a schematic illustration of the shift pattern for the transmission of FIGS. 1 and 2.

FIGS. 1–3 illustrate a 7-speed simple transmission embodiment 10 of the present invention. The transmission 10 illustrated is of the multiple identical countershaft type, it being understood, however, that single countershaft transmissions may utilize the features of the present invention. The transmission 10 comprises an input shaft 12 designed to be driven by the prime mover of the vehicle and carrying an input gear 14 thereon. A pair of compound, substantially identical countershafts 16 and a floating mainshaft/output shaft 18 are provided. The axes of the mainshaft 18 and of the compounded countershafts 16 are substantially parallel, and the axis of input shaft 12 is substantially concentric with the axis of mainshaft 18. Each of the compounded countershafts 16 comprises a first portion 20 and a second portion 22, which telescopically surrounds the first portion. The first countershaft portions 20 are mounted for rotation in the transmission housing by means of bearings 24 and 26, respectively, which are received in the forward and rearward endwalls, respectively, of transmission housing H. The second countershaft portions 22 of the compounded countershaft 16 are supported for rotation relative to the first countershaft portions 20 by means of bearings 28 carried by the first countershaft portions.

The first portions 20 of the compounded countershafts carry countershaft gears 30, 32, 34, 36, 38 and 40. The second portions 22 of the compounded countershafts carry countershaft gears 42 and 44. Gears 46, 48, 50, 52, 54, 56 and 58 encircle the mainshaft 18 and are constantly engaged with and supported by the countershaft gears 32, 34, 36, 38, 40, 42 and 44, respectively, as is well known in the prior art. Reverse gear 60 encircles the mainshaft 18 and is constantly meshed with and supported by reverse idler gears 62.

Axially slidable, double-sided jaw clutches 64, 66, 68 and 70 are splined or otherwise mounted to the mainshaft for rotation therewith and axially slidable movement relative thereto in a known manner. Clutch 64 may be utilized to selectively engage input shaft 12 or mainshaft gear 46 to the mainshaft 18. Sliding clutch 66 may be utilized to selectively engage either mainshaft gear 48 or mainshaft gear 50 to the mainshaft 18. Sliding clutch 68 may be utilized to selectively engage mainshaft gear 52 or mainshaft gear 54 to the mainshaft 18. Sliding clutch 70 may be utilized to selectively engage mainshaft gear 58 or mainshaft gear 60 to the mainshaft 18. As is known, the sliding clutches are typically positioned by shift forks associated with a shift bar housing assembly (not shown), which will include interlock means to assure that only one of the sliding clutches is displaced from its centered or neutral position at a time.

The operation and structural features of the "floating" mainshaft, multiple countershaft type of transmission described above is well known in the prior art, and a more detailed description thereof may be seen by reference to U.S. Pat. Nos. 3,105,395 and 3,500,695, the disclosures of which are incorporated herein by reference.

In operation, the input shaft 12 drives the input gear 14, which is constantly engaged with countershaft gears 30 to drive the compounded countershafts 16 and the countershaft gears mounted thereon. The countershaft gears are constantly engaged with the mainshaft gears and, thus, mainshaft gears 46, 48, 50, 52, 54, 56, 58 and 60 are constantly rotating whenever the input shaft is rotating. For example, the vehicle operator may simply move sliding clutch 70 to the right to rotationally couple reverse gear 30 to the mainshaft 18 to achieve a reverse rotation. Similarly, sliding clutch 70 may be moved to the left to rotationally couple gear 58 to the mainshaft 18 for operation in the first forward speed gear ratio. Reference to FIG. 3 will illustrate the shift pattern followed by the operator.

Clutchable mainshaft gear 54 is fixed for rotation with mainshaft idler gear 56 and together form a combined mainshaft gear and idler gear assembly. Mainshaft gears 54 and 56 may be integral. Mainshaft gear 54 is constantly meshed with countershaft gears 40 fixed to the first countershaft portion 20. Mainshaft gear 56 is constantly meshed with mainshaft gears 42 carried by the second countershaft portions 22 and, thus, countershaft gear 40, the mainshaft gear 54/idler gear 56 assembly and countershaft gear 42 form a constant driving connection between the first countershaft portion 20 and the second countershaft portion 22 of the compounded countershaft assemblies 16. Thus, the first countershaft portions 20 drive the second countershaft portions 22 through gears 40, 54, 56 and 42, allowing a further gear reduction to be achieved without the requirement of increasing the center distance of the transmission. It is noted that the term "center distance" as used in connection with single or multiple countershaft transmissions means the distance between the axis of rotation of either of the countershafts and the axis of rotation of the mainshaft.

As indicated previously, the second countershaft portions 22 of the compounded countershafts 16 are of a generally sleeve or tubular shape, telescopically surrounding the first countershaft portions 20, and are mounted for rotation relative to the first countershaft portions 20 by means of bearings 28 carried by the first countershaft portions 20 and not requiring an increased axial length of transmission or additional housing structure to carry the additional bearings.

As best seen in FIG. 2, countershaft gear 44 carried by the second countershaft portion 22 meshes with and drives the reverse idler gear 62, allowing the reverse idler 62 and reverse mainshaft gear 60 to be of substantially the same pitch diameter and number of teeth (and, thus, the same ratio) as the first forward speed gears 58 and 44.

Alternate embodiments of the present invention, transmissions 100, 200 and 300, all involving compound 10-speed transmissions, may be seen by reference to FIGS. 4 and 5, FIG. 6 and FIGS. 7 and 8, respectively. In the description of these embodiments, transmission elements functionally and structurally substantially identical to the elements of transmission 10 will be assigned like reference numerals with a "1 ," "2" or "3" (as appropriate) appended thereto.

Figure 4:
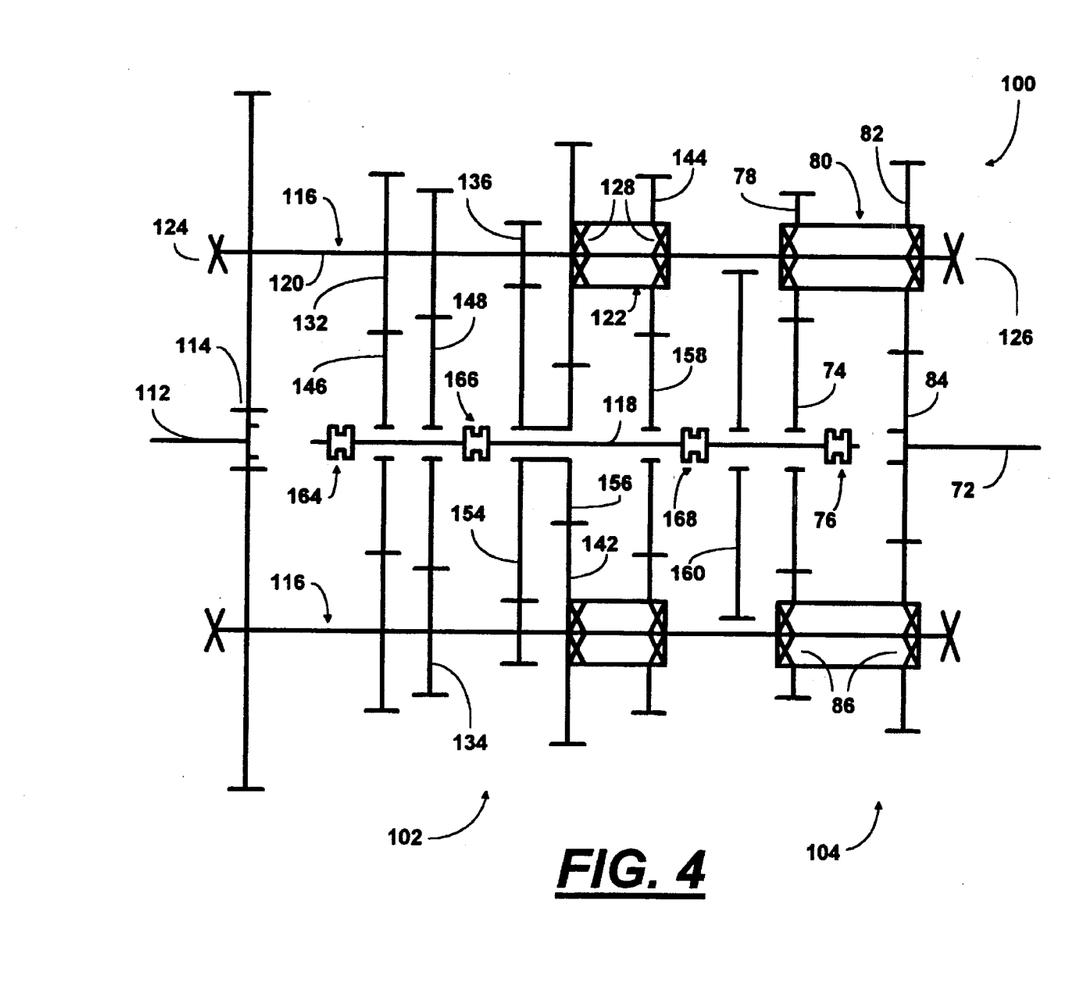
FIG. 4 is a schematic illustration of another embodiment of the present invention.
Figure 5:
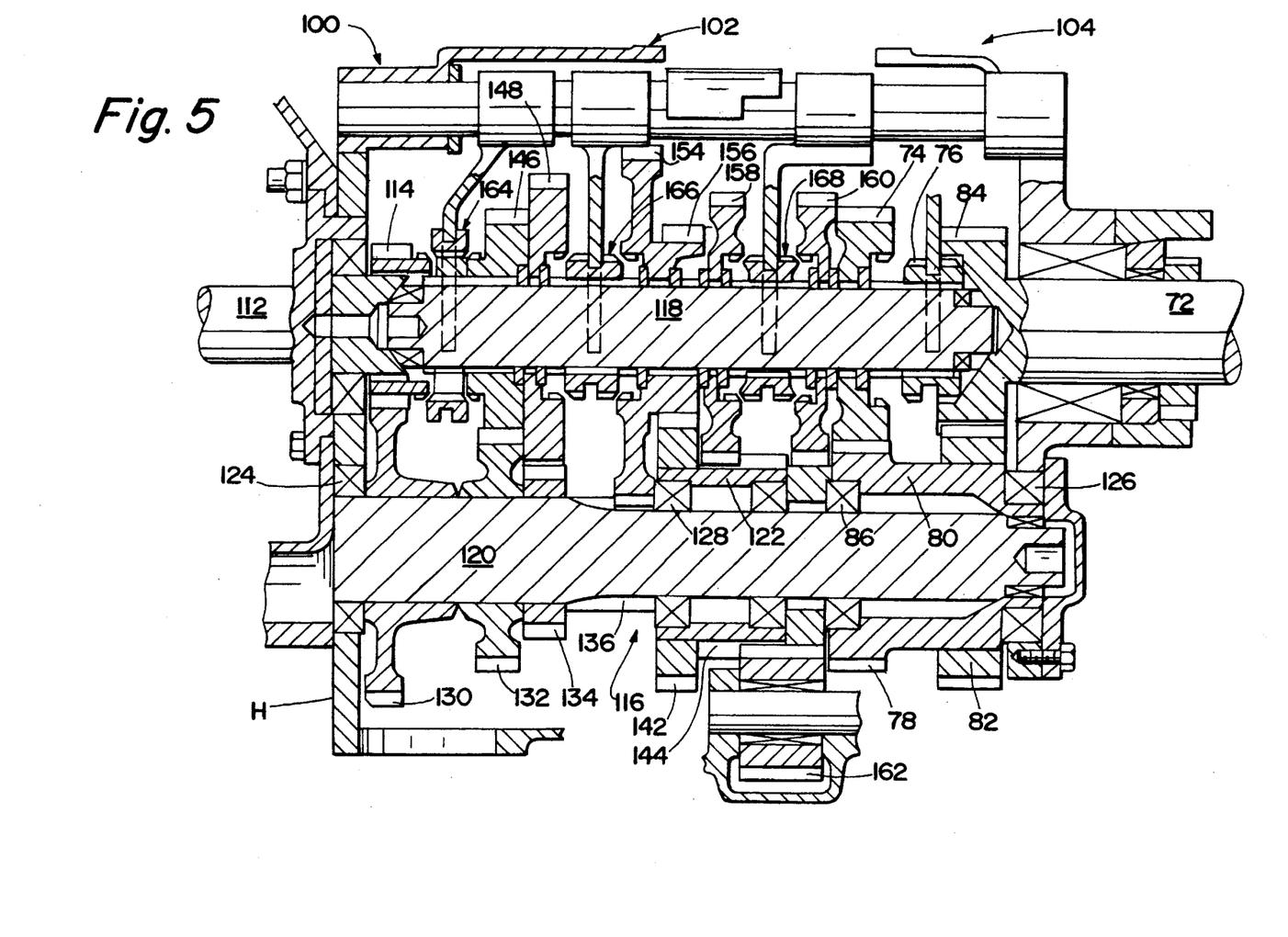
FIG. 5 is a sectional view of the transmission schematically illustrated in FIG. 4.

Transmission 100, as illustrated in FIGS. 4 and 5, is a 10-speed compound transmission comprising a 5-forward-speed main transmission section 102 connected in series with a 2-speed splitter section 104. As is well known in the prior art, in compound transmissions having a splitter-type auxiliary section, the ratio steps of the splitter auxiliary section are less than the ratio steps of the main transmission section and each mainsection ratio is split, or subdivided, by the splitter section. Examples of compound change-gear transmissions having a splitter-type auxiliary section may be seen by reference to U.S. Pat. Nos. 3,799,002; 4,290,515 and 4,440,037, the disclosures of which are incorporated herein by reference.

Transmission 100 comprises an input shaft 112 carrying a drive gear or input gear 114, which are generally coaxial with a floating mainshaft 118 and an output shaft 72. The main transmission section 102 is provided with a pair of substantially identical compounded countershafts 116, each comprising a first portion 120 and a second portion 122 supported on the first portion for rotation relative thereto.

The first portions 120 of the compounded mainsection countershafts 116 are supported for rotation in the transmission housing by means of bearings 124 and 126 received in the housing end walls, and the generally tubular second countershaft portions 122 of the mainsection countershafts are supported on the first countershaft portions 120 by means of bearings 128 carried by the first countershaft portions. The first portions 120 of the mainsection countershafts 116 carry countershaft gears 130, 132, 134 and 136 fixed for rotation therewith, while the second countershaft portions 122 of the mainsection countershafts carry countershaft gears 142 and 144 fixed for rotation therewith. Mainshaft gears 146, 148, 154, 156, 158 and 160 encircle the mainshaft and are constantly engaged with and supported by the mainsection countershaft gears (or reverse idler gear 162). Axially slidable, double-acting jaw clutches 164, 166 and 168 are provided for selectively engaging the input gear 114 or a selected mainshaft gear to the mainshaft 118.

The rearward end of mainshaft 118 extends into the splitter-type auxiliary section 104 and carries a sliding, double-acting positive jaw clutch 76 fixed for rotation therewith. Sliding jaw clutch 76 is substantially identical to jaw clutches 164, 166 and 168. A splitter gear 74 surrounds the rearward end of the mainshaft 118 in the auxiliary section 104 and is constantly meshed with and supported by auxiliary section countershaft gears 78 fixed to the auxiliary section countershafts 80. The auxiliary countershafts 80 also carry auxiliary section countershaft gears 82, which are constantly meshed with output gear 84 fixed to the output shaft 72. The sliding splitter clutch 76, normally controlled by a 2-position actuator, is effective to clutch either the mainshaft directly to the output gear 84 and output shaft 72 for direct drive through the auxiliary section 104, or to clutch splitter gear 74 to the output shaft 118, whereby the output shaft 72 will be driven through gears 74, 78, 82 and 84.

In the embodiment of transmission 100, both the second portions 122 of the mainsection countershafts and the auxiliary section countershafts 80 are generally tubular structures telescopically surrounding and supported by the first portion 120 of the mainsection countershaft 116.

By utilizing compounded mainsection countershafts 116, the range coverage of mainsection 102 and the entire compound transmission 100 are extended without unduly enlarging the transmission center distances and allowing a splitter-type auxiliary section rather than a range-type auxiliary section to be utilized. As splitter gearing is of a relatively small ratio step as compared to range section or mainsection gearing, the use of splitter gearing permits the use of a relatively inexpensive and more robust non-synchronized splitter clutch 76 rather than the somewhat complicated and expensive synchronized jaw clutch assemblies normally associated with range-type auxiliary sections. The structure illustrated in transmission 100 also minimizes or eliminates the need for intermediate transmission housing walls, the advantages of which are set forth in aforementioned U.S. Pat. No. 5,390,561.

Figure 9:
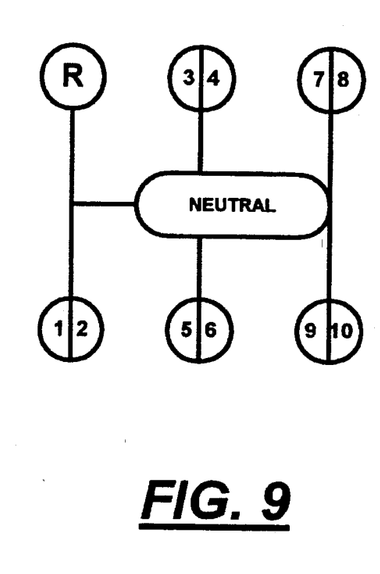
FIG. 9 is a schematic illustration of the shift pattern for the transmissions of FIGS. 4–8.

The shift pattern for transmission 100, as well as for transmissions 200 and 300 (to be described below), may be seen by reference to FIG. 9. In FIG. 9, split shifts are illustrated by the vertical line in each shift lever position. Splitter shifting may be accomplished by a manually operated switch or the like, usually a button associated with a shift lever knob, or may be automated.

Figure 6:
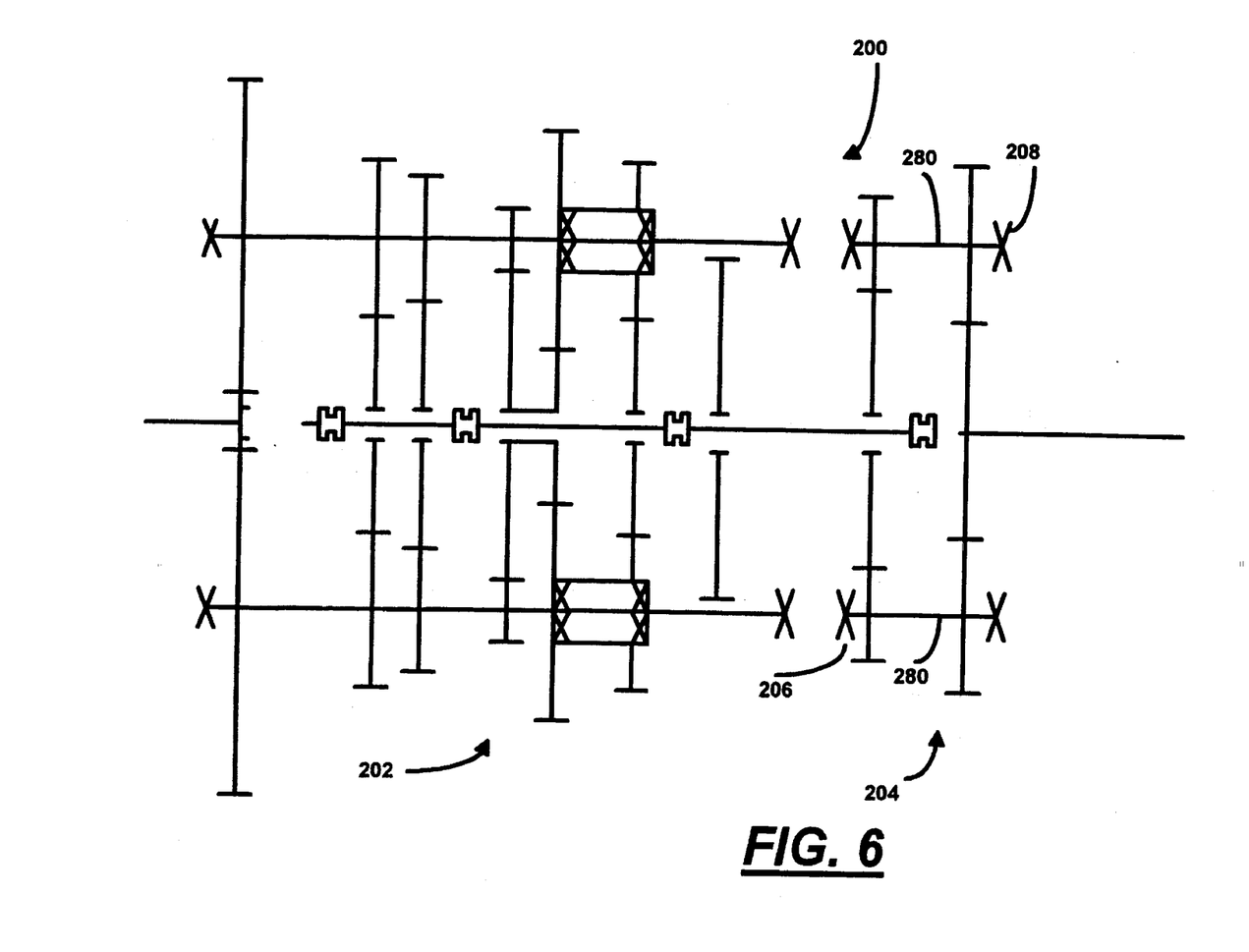
FIG. 6 is a schematic illustration of a further embodiment of the present invention.

Transmission 200, illustrated schematically in FIG. 6, is functionally substantially identical to transmission 100, described above, and is structurally substantially identical to transmission 100, with the exception that the auxiliary countershafts 280 are totally separate from the compounded main transmission section countershafts 216 and require separate bearings 206 and 208 for rotational mounting thereof in the transmission housing.

Figure 7:
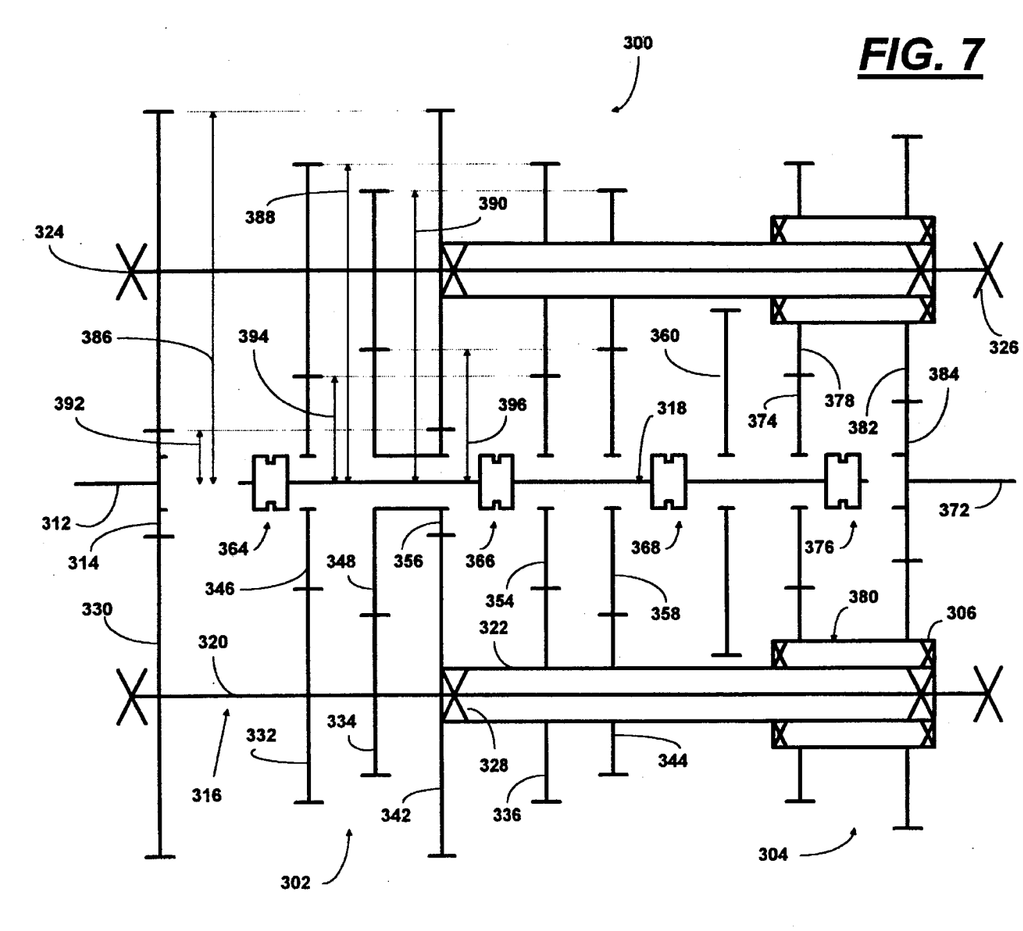
FIG. 7 is a schematic illustration of still another embodiment of the present invention.
Figure 8:
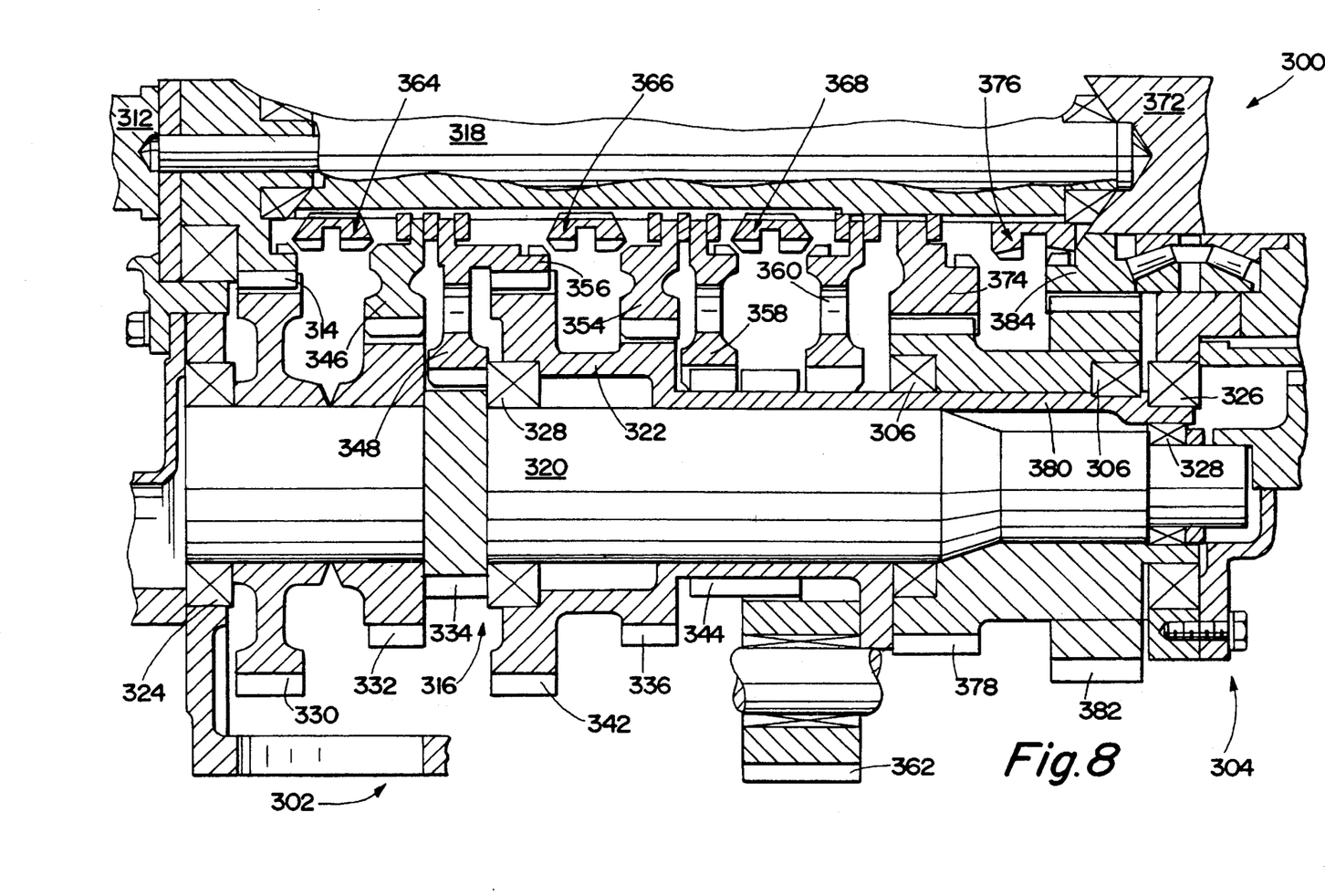
FIG. 8 is a sectional view of the transmission schematically illustrated in FIG. 7.

Transmission 300 is illustrated in FIGS. 7 and 8. Transmission 300 is a "5×2" 10-speed, splitter-type transmission similar to transmission 100 (described above), having a 5-forward-speed main transmission section 302 connected in series with a 2-speed splitter section 304.

Transmission 300 comprises an input shaft 312 carrying a drive gear 314, which are generally coaxial with a floating mainshaft 318 and an output shaft 372. The main transmission section 302 is provided with a pair of substantially identical compounded countershafts 316, each comprising a first portion 320 and a second portion 322 supported on the first portion for rotation relative thereto.

The first portions 320 of the compounded mainsection countershafts 316 are supported for rotation in the transmission housing by means of bearings 324 and 326 received in the forward and rearward housing wall, and the generally tubular second countershaft portions 322 of the mainsection countershafts are supported on the first countershaft portions 320 by means of bearings 328 carried by the first countershaft portions. The first portions 320 of the mainsection countershafts 316 carry countershaft gears 330, 332 and 334 fixed for rotation therewith, while the second countershaft portions 322 of the mainsection countershafts carry countershaft gears 342, 336 and 344 fixed for rotation therewith. Mainshaft gears 346, 348, 356, 354, 358 and 360 encircle the mainshaft 318 and are constantly engaged with and supported by the mainsection countershaft gears (or reverse idler gear 362). Axially slidable, double-acting jaw clutches 364, 366 and 368 are provided for selectively engaging the input gear 314 or a selected mainshaft gear to the mainshaft 318. It is noted that mainshaft gear 348 is clutched to mainshaft 318 by means of clutch 366 clutching idler gear 356 to the mainshaft 318, which is fixed for rotation with mainshaft gear 348.

The rearward end of mainshaft 318 extends into the splitter-type auxiliary section 304 and carries a sliding, double-acting positive jaw clutch 376 fixed for rotation therewith. Sliding jaw clutch 376 is substantially identical to jaw clutches 364, 366 and 368. A splitter gear 374 surrounds the rearward end of the mainshaft 318 in the auxiliary section 304 and is constantly meshed with and supported by auxiliary section countershaft gears 368 fixed to the auxiliary section countershafts 380. The auxiliary countershafts 380 also carry auxiliary section countershaft gears 382 fixed for rotation therewith, which are constantly meshed with the output gear 384 fixed to the output shaft 372. The sliding splitter clutch 376 is normally controlled by a 2-position actuator and is effective to clutch either the mainshaft 318 directly to the output gear 384 and output shaft 372, or to clutch auxiliary section drive gear 374 to mainshaft 318 to create a driving relationship between mainshaft 318 and output shaft 372 through gears 374, 378, 382 and 384.

As may be seen, auxiliary section output shaft 380 is also generally tubular in shape and telescopically surrounds the second mainsection countershaft portion 322 and is supported for rotation thereon by means of bearings 306 carried by the second portion 322 of the mainsection countershaft 316. Accordingly, both the compounded mainsection countershaft 316 and the auxiliary countershaft 380 define a coaxial countershaft assembly supported in the transmission housing solely by bearings carried in the front and rearward end walls of the transmission housing.

In operation, the function of transmissions 100, 200 and 300 is substantially identical. As may be seen by reference to FIG. 7, countershaft gears 330 and 342 may have the same number of teeth and pitch radius 386; countershaft gears 332 and 336 may have the same number of teeth and pitch radius 388; and countershaft gears 334 and 344 may have the same number of teeth and pitch radius 390; input shaft gear 314 and mainshaft gear 356 may have the same number of teeth and pitch radius 392; mainshaft gear 348 and mainshaft gear 358 may have the same number of teeth and pitch radius 394; and mainshaft gears 348 and 358 may have the same number of teeth and pitch radius 396, all of which may allow the use of common gear cutting and finishing equipment, minimize machining setup time and minimize the cost of required manufacturing and test tooling.

Accordingly, it may be seen that both simple transmissions utilizing a compounded countershaft structure and compound transmission utilizing a compounded main transmission section countershaft structure are provided wherein the compounded countershafts comprise a first and second portion, one of the portions being of a generally tubular structure telescopically surrounding the other of the countershaft portions and rotatably supported thereon to provide extended range coverage while minimizing the axial length of the transmission and the requirement for additional bearing support structures within the transmission housing structure. Further, by judicious use of gearing, one or more layers of the compounded transmission structure may utilize gears having a common number of teeth and pitch diameter to minimize tooling, machining and/or setup time requirements.

Although the present invention has been described in its preferred forms with a certain degree of particularity, it is understood that the present disclosure of the preferred embodiments has been made only by way of example and that numerous changes in the details of construction and combination and arrangement of parts may be resorted to without departing from the spirit and the scope of the invention as hereinafter claimed.

I claim:

1. A mechanical change-gear transmission comprising:

an input shaft having an input gear supported thereon for rotation therewith;

a mainshaft generally coaxial with said input shaft;

at least one compounded countershaft having an axis of rotation substantially parallel to the axis of rotation of said mainshaft, said countershaft having a plurality of countershaft gears supported thereby for rotation therewith, one of said countershaft gears in constant meshing engagement with said input gear to establish a constant driving relation between said input shaft and said countershaft;

a plurality of mainshaft gears surrounding said mainshaft for free rotation relative thereto, each of said mainshaft gears being constantly meshed with one of said countershaft gears; and means to selectively clutch said mainshaft gears, one at a time, to said mainshaft to establish a driving relationship between said countershaft and said mainshaft;

said compounded countershaft comprising a first portion carrying said countershaft gear constantly meshed with said input gear and a second portion, a countershaft gear on said first portion and a countershaft gear on said second portion each being constantly meshed with an idler gear member to establish a constant driving relationship between said first and second countershaft portions wherein rotation of said input shaft cause said first portion to have a greater angular velocity than said second portion, one of said first and second countershaft portions being of a generally tubular shape and telescopically surrounding the other of said countershaft portions and supported thereon by bearings carried by said other of said countershaft portions.

2. The transmission of claim 1 wherein said idler gear member telescopically surrounds said mainshaft and is fixed for rotation with and includes one of said mainshaft gears.

3. The transmission of claim 2 wherein said idler gear member is integral with said mainshaft gear fixed for rotation therewith.

4. The transmission of claim 1 wherein said second countershaft portion telescopically surrounds said first countershaft portion.

5. The transmission of claim 2 wherein said second countershaft portion telescopically surrounds said first countershaft portion and is supported for rotation thereon.

6. The transmission of claim 1 wherein said transmission is a compound transmission comprising a mainsection containing said compounded countershaft connected in series with an auxiliary transmission section, said auxiliary transmission section defining at least one auxiliary section countershaft.

7. The transmission of claim 4 wherein said transmission is a compound transmission comprising a mainsection containing said compounded countershaft connected in series with an auxiliary transmission section, said auxiliary transmission section defining at least one auxiliary section countershaft.

8. The transmission of claim 5 wherein said transmission is a compound transmission comprising a mainsection containing said compounded countershaft connected in series with an auxiliary transmission section, said auxiliary transmission section defining at least one auxiliary section countershaft.

9. The transmission of claim 6 wherein said auxiliary section is a splitter-type auxiliary section comprising a non-synchronized splitter clutch.

10. The transmission of claim 7 wherein said auxiliary section is a splitter-type auxiliary section comprising a non-synchronized splitter clutch.

11. The transmission of claim 7 wherein said auxiliary section countershaft comprises a generally tubular member surrounding said first countershaft portion.

12. The transmission of claim 10 wherein said auxiliary section countershaft comprises a generally tubular member surrounding said first countershaft portion.

13. The transmission of claim 11 wherein said auxiliary section countershaft portion telescopically surrounds said second portion of said compounded countershaft and is rotatably supported thereon by bearings carried by said second portion.

14. The transmission of claim 12 wherein said auxiliary section countershaft portion telescopically surrounds said second portion of said compounded countershaft and is rotatably supported thereon by bearings carried by said second portion.

15. The transmission of claim 1 wherein at least one countershaft gear carried by each of said first and second countershaft portions are of the same number of teeth and same pitch diameter.

16. The transmission of claim 1 wherein at least one countershaft gear carried by each of said first and second countershaft portions are of the same number of teeth and same pitch diameter.

17. The transmission of claim 5 wherein at least one countershaft gear carried by each of said first and second countershaft portions are of the same number of teeth and same pitch diameter.

18. The transmission of claim 7 wherein at least one countershaft gear carried by each of said first and second countershaft portions are of the same number of teeth and same pitch diameter.

19. The transmission of claim 1 wherein at least two countershaft gears carried by said first countershaft portion are of the same number of teeth and pitch diameter as countershaft gears carried by said second countershaft portion.

20. The transmission of claim 7 wherein at least two countershaft gears carried by said first countershaft portion are of the same number of teeth and pitch diameter as countershaft gears carried by said second countershaft portion.

21. The transmission of claim 11 wherein at least two countershaft gears carried by said first countershaft portion are of the same number of teeth and pitch diameter as countershaft gears carried by said second countershaft portion.

22. The transmission of claim 7 wherein said first countershaft portion carries a first, a second and a third countershaft gear and said second countershaft portion carries a fourth, a fifth and a sixth countershaft gear, said first and fourth countershaft gears being of the same number of teeth and pitch diameter, said second and fifth countershaft gears being of the same number of teeth and pitch diameter, and said third and sixth countershaft gears being of the same number of teeth and pitch diameter.

23. The transmission of claim 11 wherein said first Countershaft portion carries a first, a second and a third countershaft gear and said second countershaft portion carries a fourth, a fifth and a sixth countershaft gear, said first and fourth countershaft gears being of the same number of teeth and pitch diameter, said second and fifth countershaft gears being of the same number of teeth and pitch diameter, and said third and sixth countershaft gears being of the same number of teeth and pitch diameter.

24. The transmission of claim 13 wherein said first countershaft portion carries a first, a second and a third countershaft gear and said second countershaft portion carries a fourth, a fifth and a sixth countershaft gear, said first and fourth countershaft gears being of the same number of teeth and pitch diameter, said second and fifth countershaft gears being of the same number of teeth and pitch diameter, and said third and sixth countershaft gears being of the same number of teeth and pitch diameter.

25. The transmission of claim 23 wherein said first countershaft gear meshes with an input gear and said fourth countershaft gear meshes with said idler gear member.

26. The transmission of claim 24 wherein said first countershaft gear meshes with an input gear and said fourth countershaft gear meshes with said idler gear member.

27. The change-gear transmission of claim 1 wherein at least two substantially identical compounded countershafts are provided, each of said compounded countershafts carrying a like plurality of countershaft gears for rotation therewith, one substantially identical countershaft gear on each of said compounded countershafts being in constant meshing engagement with each mainshaft gear, said mainshaft gear supported on the countershaft gears in meshing engagement therewith.

28. The change-gear transmission of claim 11 wherein at least two substantially identical compounded countershafts are provided, each of said compounded countershafts carrying a like plurality of countershaft gears for rotation therewith, one substantially identical countershaft gear on each of said compounded countershafts being in constant meshing engagement with each mainshaft gear, said mainshaft gear supported on the countershaft gears in meshing engagement therewith.

* * * * *